(12) United States Patent
Suginoya et al.

(10) Patent No.: US 6,222,604 B1
(45) Date of Patent: *Apr. 24, 2001

(54) DISPLAY DEVICE AND METHOD OF MANUFACTURING THE SAME

(75) Inventors: Mitsuru Suginoya; Kazuo Shimada; Sachiko Kumai, all of Chiba (JP)

(73) Assignee: Seiko Instruments Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,289

(22) Filed: Feb. 7, 1997

(30) Foreign Application Priority Data

Feb. 29, 1996 (JP) .................................................. 8-043522

(51) Int. Cl.$^7$ ........................... G02F 1/1333; C03C 15/00
(52) U.S. Cl. ........................... 349/158; 65/30.14
(58) Field of Search ................... 349/158, 122; 65/30.1, 60.1, 60.51, 30.14, 116

(56) References Cited

U.S. PATENT DOCUMENTS

| | | | |
|---|---|---|---|
| 4,024,613 | * | 5/1977 | Martel et al. ....................... 228/111 |
| 4,538,158 | * | 8/1985 | Warszawski ....................... 346/135.1 |
| 4,846,868 | * | 7/1989 | Aratani ................................. 65/30.14 |
| 4,993,810 | * | 2/1991 | Demiryont ........................... 359/265 |
| 5,285,517 | * | 2/1994 | Wu ....................................... 385/142 |
| 5,410,423 | * | 4/1995 | Furushima et al. .................... 359/80 |
| 5,681,609 | * | 10/1997 | Kitayama et al. .................... 427/129 |
| 5,684,548 | * | 11/1997 | Ariki et al. ............................. 349/57 |
| 5,764,318 | * | 6/1998 | Kurematsu et al. ...................... 349/5 |

FOREIGN PATENT DOCUMENTS 56-044405B * 10/1981 (JP) .
61-251541 * 11/1986 (JP) .

* cited by examiner

Primary Examiner—William L. Sikes
Assistant Examiner—Dung Nguyen
(74) Attorney, Agent, or Firm—Adams & Wilks

(57) ABSTRACT

A display device comprises a pair of opposed soda-lime glass substrates. A chemically reinforced layer having a thickness of 20 $\mu$m or less is disposed on the surface of at least one of the opposing soda-lime glass substrates. An electrode is disposed on opposed surfaces of the soda-lime glass substrates, and a display material is disposed between the pair of opposing soda-lime glass substrates.

16 Claims, 2 Drawing Sheets

1
2 Sodium passivation film
3
7
8
6
4
5 Sodium passivation film

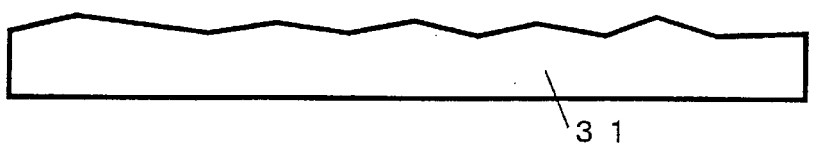
FIG. 2(A)
FIG. 2(B)
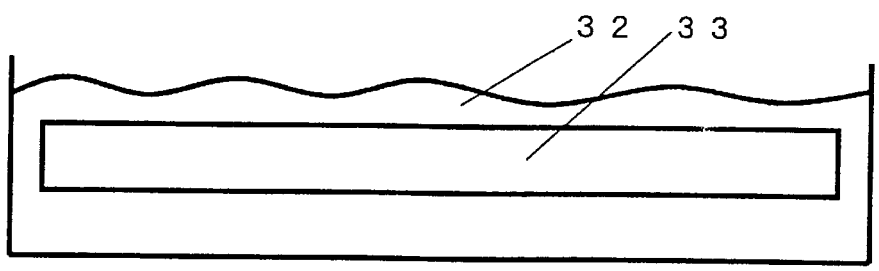
FIG. 2(C)
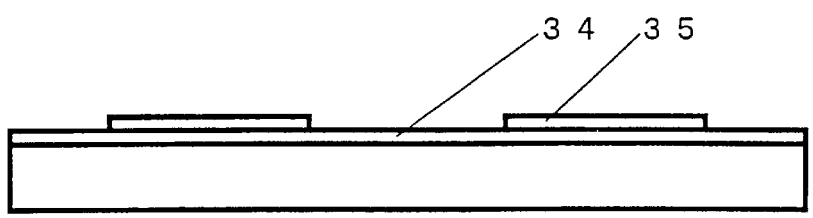
FIG. 2(D)
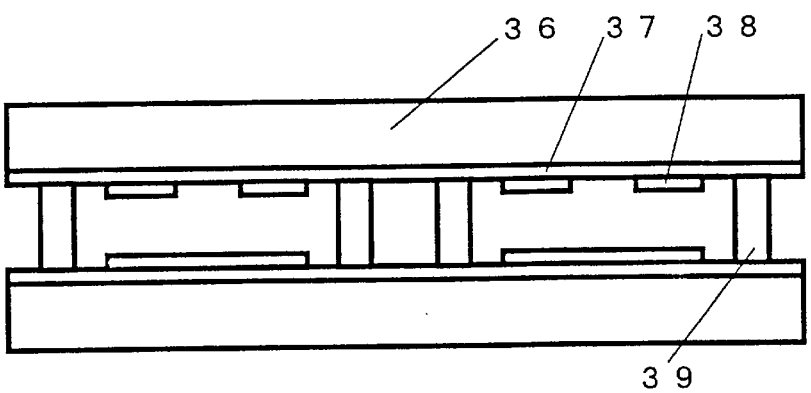
FIG. 2(E)
FIG. 2(F)
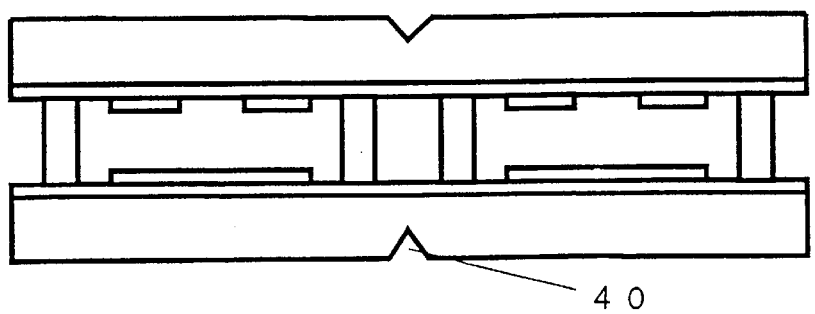

DISPLAY DEVICE AND METHOD OF MANUFACTURING THE SAME

BACKGROUND OF THE INVENTION

The present invention relates to a display device and a method of manufacturing the same, and more particularly, to a display device which has been improved in the strength of impact-resistant properties or the like and a method of manufacturing the same.

A schematic structure of a conventional display device will be described below. A sodium passivation film made of $SiO_2$ is formed on the surface of a glass substrate made of soda-lime glass, borosilicate glass, or the like, and further a transparent electrode made of film-like ITO grown by a method such as evaporation or sputtering is formed thereon while being patterned. Two glass substrates, on the surface of each of which the sodium passivation film and the transparent electrode are sequentially formed as described above, are bonded to each other with a sealing agent so that they are opposite to each other, and a display material such as a liquid crystal or an electrochromic material is enclosed in the gap between the glass substrates to form the display device.

Since such a display device is excellent in portability and consumes little electric power, contrary to a CRT or the like, it is widely used at present for a digital watch, a display for a computer, and so on.

However, since a highly transparent substrate is desired for such a flat panel display, a glass substrate is used in the existing circumstances. However, the glass substrate has a defect that it is liable to break because it is made of glass.

Especially, since the flat panel display is often used for a portable electric equipment, it is required to be strong against impact of drop. On the other hand, since the portable electric equipment is desired to be light, thin, short, and small, the thickness of the glass substrate is required to be thin, which results in deterioration in the strength. That is, the display device has such a contradictory problem.

SUMMARY OF THE INVENTION

It is therefore an object of the present invention to realize a display device which has sufficient strength even if the thickness of a glass substrate is made thin.

In order to solve the problem, according to the present invention, in a display device in which a pair of glass substrates, on the surface of each of which an electrode is formed, are opposite to each other, and a display material is enclosed in the gap between the substrates, a chemically reinforced layer having a thickness of not larger than 20 µm is formed on the surface of at least one of the glass substrates. Further, a method of manufacturing the display device comprises a chemical reinforcing treatment step of immersing a glass substrate in a solution or a molten solution of salt containing positive ions having an ion radius larger than that of sodium to form a chemically reinforced layer having a thickness of not larger than 20 µm on the glass substrate.

Still further, a method of manufacturing the display device comprises the steps of immersing a glass substrate in a solution or a molten solution of salt containing positive ions having an ion radius larger than that of sodium, forming a chemically reinforced layer having a thickness of not larger than 20 µm on the glass substrate, forming a plurality of cells composed of a pair of glass substrates using the glass substrate on which the chemically reinforced layer is formed, scratching the surface of the glass substrate on which the chemically reinforced layer is formed, and cutting the glass substrate to divide the cells into individual ones.

In the display device according to the present invention, sodium atoms on the surface of the glass substrate are replaced with atoms having an ion radius larger than that of sodium, so that the substrate is chemically reinforced and has an improved mechanical strength.

Further, the strength of the glass of the display device can be improved by merely adding a step of immersing the glass substrate in the solution or molten solution containing the positive ions having an ion radius larger than that of sodium, which is very simple. Further, according to this method, the thickness of the chemically reinforced layer can be easily controlled by adjusting an immersion time or the like, and the device can be formed under such a condition that working of glass cutting or the like can be carried out even after reinforcement of the substrate.

Still further, in the case where glass having a thickness of not larger than 2 mm, if the thickness of the chemically reinforced layer is not larger than 20 µm, the display device having sufficient mechanical strength can be easily obtained without extremely complicating a conventional step of glass cutting or the like.

BRIEF DESCRIPTION OF THE DRAWINGS

FIGS. 2(A) to 2(F) are views depicting manufacturing steps of the display device according to the present invention.

DETAILED DESCRIPTION OF THE PREFERRED EMBODIMENTS

Figure 1:
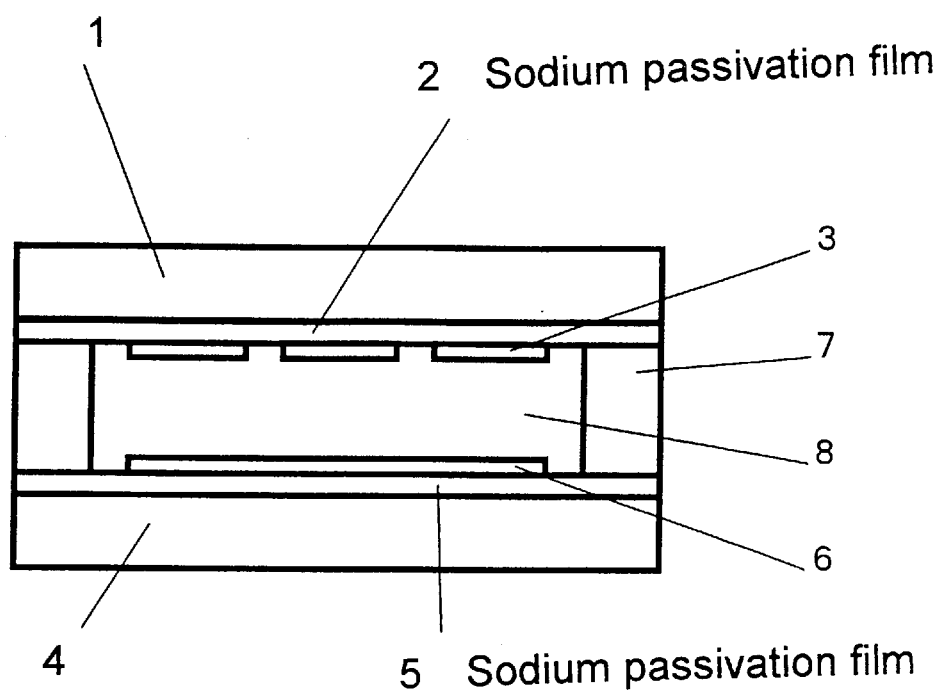
FIG. 1 is a sectional view showing a display device according to the present invention.

Glass has originally considerable strength in theory. However, in practice, it is easily broken because of its brittleness. The reason is that since tensile stress exists on the surface of glass, if some kind of defects are distributed on the surface, the stress is concentrated to the defects and they become break starting points so that the glass is broken at a level considerably lower than theoretical strength. In view of such breaking mechanism of glass, there are proposed reinforced glass such as wind-cooled tempered glass, low expansion glass, high elasticity glass, crystallized glass, and chemically reinforced glass.

The wind-cooled tempered glass has strength against breakage, which is improved by converting tensile stress existing on the surface of glass to compressive stress. Concretely, jets of air are blown to the surface of a glass plate heated up to about 700° C., and the glass plate is cooled while keeping the temperature difference between the interior and the surface. As a result, in the solidified state, distortion remains as compressive stress on the surface and as tensile stress in the interior according to the temperature difference, so that the strength of the glass is improved. At this time, the compressive stress on the surface reaches 900–1500 $kg/cm^2$, and the tensile stress in the interior becomes 300–500 $kg/cm^2$. It is said that the thickness of a practical reinforced layer is one sixth of the thickness of the glass or not less than 100 µm.

The low expansion glass is devised to prevent glass from breaking due to thermal stress generated when the glass is heated or cooled.

The high elasticity glass is made by introducing nitrogen, which has strong bonding force, into conventional oxide glass to reinforce the mesh of the glass. The elasticity thereof is much improved to the degree of 30 to 50 percent, and therefore the strength is improved.

The crystallized glass is a kind of composite material in which crystal grains are dispersed into the matrix by reheating glass, and the progress of crack from breakage is blocked by the crystal grains.

The chemically reinforced glass has, like the wind-cooled tempered glass, improved strength against breakage by converting the tensile stress existing on the glass surface to the compressive stress. Concretely, glass containing alkaline ions (Li, Na, etc.) having a small ion radius is immersed in alkaline molten salt having a large ion radius at a temperature (for example, 400° C.) within a range not higher than the glass transition point, so that ion exchange between both is carried out on the surface of the glass. As a result, the volume is increased in the layer of glass surface, where the compressive stress exists after cooling. The compressive stress of about 100 Kg/mm$^2$ can be obtained.

Among these reinforced glasses, the wind-cooled tempered glass, low expansion glass, high elasticity glass, and crystallized glass are difficult to be applied to a display device since they have such restriction that their glass compositions themselves are changed or the reinforcing treatment is carried out during the production of glass so that it can not be carried out at a post working step. On the other hand, the chemically reinforced glass can be included in manufacturing steps of a display device since the chemical reinforcing treatment can be carried out at a relatively low temperature. That is, even after a step (polishing step, etc.) peculiar to a display device is carried out, the chemical reinforcing treatment can be carried out, so that the use of the chemically reinforced glass does not largely change and complicate conventional manufacturing steps of a display device.

When a flat panel display for a liquid crystal display device or the like is fabricated, there are adopted steps in which a large number of display device cells are formed on two large glass substrates, the two large glass substrates are bonded to each other, and then the substrates are cut to divide the display device cells into individual ones. This cutting is generally carried out by scratching the surface of the glass by a hard blade of diamond or the like and then applying a pressure to the glass to break it. In the case where the glass is chemically reinforced, if the chemically reinforced layer is too thick, the scratch is hard to be transmitted into the interior of the glass, so that the cutting and dividing can not be carried out well and end faces of the divided cells do not become linear.

Accordingly, in the present invention, the chemical reinforcement is selected as a method of reinforcing glass, and the chemical reinforcing step is made to be carried out in manufacturing steps of a display device so that the cutting and dividing step can be carried out like a conventional method.

That is, a glass substrate having a thickness of not larger than 2 mm is immersed in a solution or a molten solution of salt containing positive ions having an ion radius larger than that of sodium, so that a chemically reinforced layer having a thickness of not larger than 20 μm is formed on the surface of the glass substrate.

According to this method, since sodium atoms on the surface of the glass substrate are replaced with atoms having an ion radius larger than that of sodium so that the glass substrate is chemically reinforced, even if the thickness of the glass substrate is made thin, sufficient strength can be kept. Further, this method does not complicate conventional steps such as glass cutting.

Here, it is sufficient that the glass substrate contains alkaline ions even if the quantity thereof is extremely small. Lead glass, borosilicate glass and the like can be used, not to mention soda glass.

Hereinafter, examples of the present invention will be concretely described with reference to FIGS. 1 and 2.

EXAMPLE 1

FIG. 1 is a schematic sectional view showing an example of a display device according to the present invention. Although the basic structure thereof is similar to that of a conventional display device, the surfaces of glass substrates 1 and 4 made of soda glass are chemically reinforced. Sodium passivation films 2 and 5 made of SiO$_2$ are formed on the chemically reinforced glass substrates, and further transparent electrodes 3 and 6 made of film-like ITO grown by a method such as evaporation or sputtering are formed on the upper surfaces of the passivation films while being patterned. The thus formed glass substrates 1 and 4 are made opposite to each other and bonded with a sealing agent 7, and a display material 8 made of an STN liquid crystal is enclosed in the gap between the substrates to form the display device.

FIGS. 2(A) to 2(F) depict a method of manufacturing a display device, including a chemical reinforcing step of the present invention. In FIG. 2(A), a soda glass 31 having a thickness of 0.55 mm is prepared. In FIG. 2(B), the soda glass is polished until the flatness of the surface sufficient for a display device can be obtained. In FIG. 2(C), the soda glass is immersed in a reinforcing solution 32 made of a mixed molten salt of 50% KNO$_3$ and 50% KNO$_2$ with a temperature of 430° C., so that a chemically reinforced glass substrate 33 is obtained. This immersion time was adjusted so that the thickness of a chemically reinforced layer was 8 μm from the surface. In FIG. 2(D), a sodium passivation film 34 made of SiO$_2$, and transparent electrodes 35 made of film-like ITO grown by a method such as evaporation or sputtering, the number of which is equal to that of a plurality of display devices to be formed and the patterns of which are equal to each other, are formed on the glass substrate. In FIG. 2(E), a sodium passivation film 37 and a plurality of transparent electrodes 38 are formed on a glass substrate 36, the surface of which is chemically reinforced like the glass substrate 33. The glass substrate 36 is made opposite to the glass substrate 33 and both are bonded with sealing agents 39, so that a plurality of cells are formed from the same glass substrates. In FIG. 2(F), linear scratches 40 are made on the glass substrates by a diamond blade at positions where the substrates are expected to be divided. Thereafter, the vicinities of the scratches 40 are pressurized to cut and divide the glass. A display material made of an STN liquid crystal is enclosed in the gap of individually divided cells to form the display device.

In such an STN liquid crystal device, to realize the uniform thickness of a liquid crystal layer, the precision of 0.05 μm is required for the flatness of the surface of the substrate. Thus, polishing of the glass surface is an indispensable step. However, if the reinforced glass is used as a raw material from the first, polishing of the surface is hard to be performed and causes an extreme difficulty. However, as in this example, if the chemical reinforcing treatment is carried out at a relatively low temperature after polishing, the flatness of the glass surface can be easily obtained, and the warp and undulation of the glass can be avoided even in the subsequent reinforcing treatment, so that the display device improved in the strength can be realized without degrading the display performance.

Further, in spite of the reinforced glass, cutting and dividing was able to be carried out almost without changing a conventional step, so that the display device was able to be fabricated very simply. Nevertheless, when the display device according to this example was dropped from the height of 2 m, no damage was observed, which showed that the device is superior in mechanical strength.

COMPARATIVE EXAMPLE

A display device was fabricated under the same conditions as example 1 except that a time of chemical reinforcement treatment in example 1 was prolonged so that the thickness of the chemically reinforced layer was 25 $\mu$m from the surface thereof. In the cutting and dividing step, the broken surface of glass become sawlike and a large number of cracks were observed. Further, when the display device was dropped from the height of 2 m, it was broken from the cracks.

EXAMPLE 2

A glass substrate was a soda glass having a thickness of 0.7 mm, which was immersed in a reinforcement solution 42 made of $KNO_3$ molten salt heated up to 400° C. so that it was chemically reinforced. A display device was fabricated under the same conditions as example 1 except that an immersion time at the chemical reinforcement was adjusted so that the thickness of a chemically reinforced layer was 15 $\mu$m from the surface thereof. Also in this example, the same effects as example 1 were obtained.

EXAMPLE 3

A glass substrate was a soda glass having a thickness of 1.1 mm, and an immersion time for chemical reinforcement was adjusted so that the thickness of a chemically reinforced layer was 20 $\mu$m from the surface thereof. A display device was fabricated under the same conditions as example 1 except the above. Also in this example, the same effects as example 1 were obtained.

EXAMPLE 4

A glass substrate was a lead glass and a display device was fabricated under the same conditions as example 1 except the above. Also in this example, the same effects as example 1 were obtained.

EXAMPLE 5

A glass substrate was a borosilicate glass, and a display device was fabricated under the same conditions as Example 1 except the above. Also in this example, the same effects as Example 1 were obtained.

According to these methods, sodium atoms on the surface of the glass are replaced with atoms having an ion radius larger than that of sodium so that the chemical reinforcement was carried out. Accordingly, even if the thickness of the glass substrate is made thin, sufficient strength can be kept. Further, since the chemical reinforcing treatment can be carried out after polishing of the surface of the glass substrate, the reinforced glass having high precision of surface roughness can be easily obtained.

Further, in the case where the glass substrate having a thickness of not larger than 2 mm, if the thickness of the chemically reinforced layer is made not larger than 20 $\mu$m, sufficient mechanical strength can be obtained, and further a conventional step such as glass cutting is not complicated. That is, a portable display device improved in strength against impact of drop can be easily obtained.

A glass substrate especially effective in the present invention is a soda glass substrate containing a large amount of sodium.

What is claimed is:

1. A display device comprising: a pair of opposing soda-lime glass substrates having opposed surfaces; a chemically reinforced layer having a thickness of 20 $\mu$m or less disposed on at least one of the opposed surfaces of the soda-lime glass substrates, the chemically reinforced layer having a compressive stress of 100 Kg/mm$^2$; electrodes disposed over the opposed surfaces of the soda-lime glass substrates; and a display material disposed between the pair of opposing soda-lime glass substrates.

2. A display device according to claim 1; wherein the thickness of the chemically reinforced layer is 3–20 $\mu$m.

3. A display device according to claim 1; wherein the thickness of the chemically reinforced layer is 8 $\mu$m.

4. A display device according to claim 1; wherein a chemically reinforced layer having a thickness of 20 $\mu$m or less is disposed on the surface of the other of the opposing soda-lime glass substrates.

5. A display device according to claim 4; wherein the thickness of the chemically reinforced layer disposed on the surface of the other of the opposing soda-lime glass substrates is 3–20 $\mu$m.

6. A display device according to claim 4; wherein the thickness of the chemically reinforced layer disposed on the surface of the other of the opposing soda-lime glass substrates is 8 $\mu$m.

7. A display device according to claim 1; wherein each of the opposing soda-lime glass substrates has a thickness of 2 mm or less.

8. In a method of manufacturing a display device having a soda-lime glass substrate, the improvement comprising:
   a chemical reinforcing treatment step of immersing the soda-lime glass substrate in a solution or a molten solution of salt containing positive ions having an ion radius larger than that of sodium to form on the soda-lime glass substrate a chemically reinforced layer having a thickness of 20 $\mu$m or less and a compressive stress of 100 Kg/mm$^2$.

9. A method of manufacturing a display device, comprising the steps of:
   immersing a soda-lime glass substrate having a thickness of 2 mm or less in a solution or a molten solution of salt containing positive ions having an ion radius larger than that of sodium;
   forming a chemically reinforced layer having a thickness of 20 $\mu$m or less on the soda-lime glass substrate and a compressive stress of 100 Kg/mm$^2$;
   fabricating a plurality of cells made of a pair of glass substrates by using the soda-lime glass substrate on which the chemically reinforced layer has been formed;
   marking the surface of the soda-lime glass substrate on which the chemically reinforced layer has been formed to form division lines; and
   cutting the soda-lime glass substrate at the division lines to form individual cells.

10. A method of manufacturing a display device, comprising the steps of:
    immersing a first soda-lime glass substrate in a solution of salt containing positive ions having an ion radius greater than that of sodium to form on a surface of the first soda-lime glass substrate a reinforcement layer having a thickness of 20 μm or less and a compressive stress of 100 Kg/mm$^2$;

forming an electrode on the reinforcement layer of the first soda-lime glass substrate;

immersing a second soda-lime glass substrate in a solution of salt containing positive ions having an ion radius greater than that of sodium to form on a surface of the second soda-lime glass substrate a reinforcement layer having a thickness of 20 μm or less and a compressive stress of 100 Kg/mm$^2$;

forming an electrode on the reinforcement layer of the second soda-lime glass substrate;

disposing the surface of the first soda-lime glass substrate in confronting and spaced-apart relation to the surface of the second soda-lime glass substrate to define a gap therebetween; and disposing a liquid crystal display material in the gap defined between the surfaces of the first and second soda-lime glass substrates.

11. A method according to claim 10; wherein the thickness of each of the reinforcement layers is 3–20 μm.

12. A method according to claim 10; wherein the thickness of each of the reinforcement layers is 8 μm.

13. A method according to claim 10; wherein the thickness of each of the reinforcement layers is 3–20 μm.

14. A method according to claim 10; wherein the thickness of each of the reinforcement layers is 8 μm.

15. A display device comprising: a pair of opposing soda-lime glass substrates having opposed surfaces; a chemically reinforced layer having a compressive stress of 100 Kg/mm$^2$ disposed on at least one of the opposed surfaces of the soda-lime glass substrates; electrodes disposed over the opposed surfaces of the soda-lime glass substrates; and a display material disposed between the pair of opposing soda-lime glass substrates.

16. In a method of manufacturing a display device having a soda-lime glass substrate, the improvement comprising:

a chemical reinforcing treatment step of immersing the soda-lime glass substrate in a solution or a molten solution of salt containing positive ions having an ion radius larger than that of sodium to form on the soda-lime glass substrate a chemically reinforced layer having a compressive stress of 100 Kg/mm$^2$.

* * * * *